United States Patent [19]

Cornett

[11] Patent Number: 4,483,190

[45] Date of Patent: Nov. 20, 1984

[54] MUZZLE VELOCIMETER

[75] Inventor: Paul C. Cornett, Golden Valley, Minn.

[73] Assignee: FMC Corporation, Chicago, Ill.

[21] Appl. No.: 422,765

[22] Filed: Sep. 24, 1982

[51] Int. Cl.³ .............................................. G01P 3/66
[52] U.S. Cl. .................................... 73/167; 102/209; 324/179
[58] Field of Search ................... 73/167; 324/174, 179

[56] References Cited

U.S. PATENT DOCUMENTS

| | | | |
|---|---|---|---|
| 2,918,007 | 12/1959 | Zaugg | 102/209 |
| 3,497,770 | 2/1970 | Nellis | 324/179 X |
| 3,659,201 | 4/1972 | Vogelsang | 324/179 |
| 3,787,770 | 1/1974 | Cote et al. | 324/179 |
| 4,228,397 | 10/1980 | Schmidt | 324/179 |
| 4,422,041 | 12/1983 | Lienau | 324/174 |

FOREIGN PATENT DOCUMENTS

| | | | |
|---|---|---|---|
| 950700 | 7/1974 | Canada | 102/209 |
| 23365 | 2/1981 | Fed. Rep. of Germany | 102/209 |

*Primary Examiner*—Daniel M. Yasich
*Attorney, Agent, or Firm*—Lloyd B. Guernsey; Richard B. Megley

[57] ABSTRACT

A muzzle velocimeter comprising a pair of sensors positioned adjacent to the path of a projectile containing magnetic material wherein each of the sensors includes a permanent magnet having a wire coil wound thereon. The magnets provide magnetic fields which are disturbed by magnetic materials in a passing projectile causing each of the sensor coils to develop signal pulses. The distance between the sensor coils and the amount of time between the sensor coil pulses are used to calculate the velocity of the passing projectile. In an alternate embodiment a single sensor coil is used to sense the leading and trailing edges of a passing projectile, and the projectile velocity calculated by using projectile length and passing time of the projectile.

5 Claims, 12 Drawing Figures

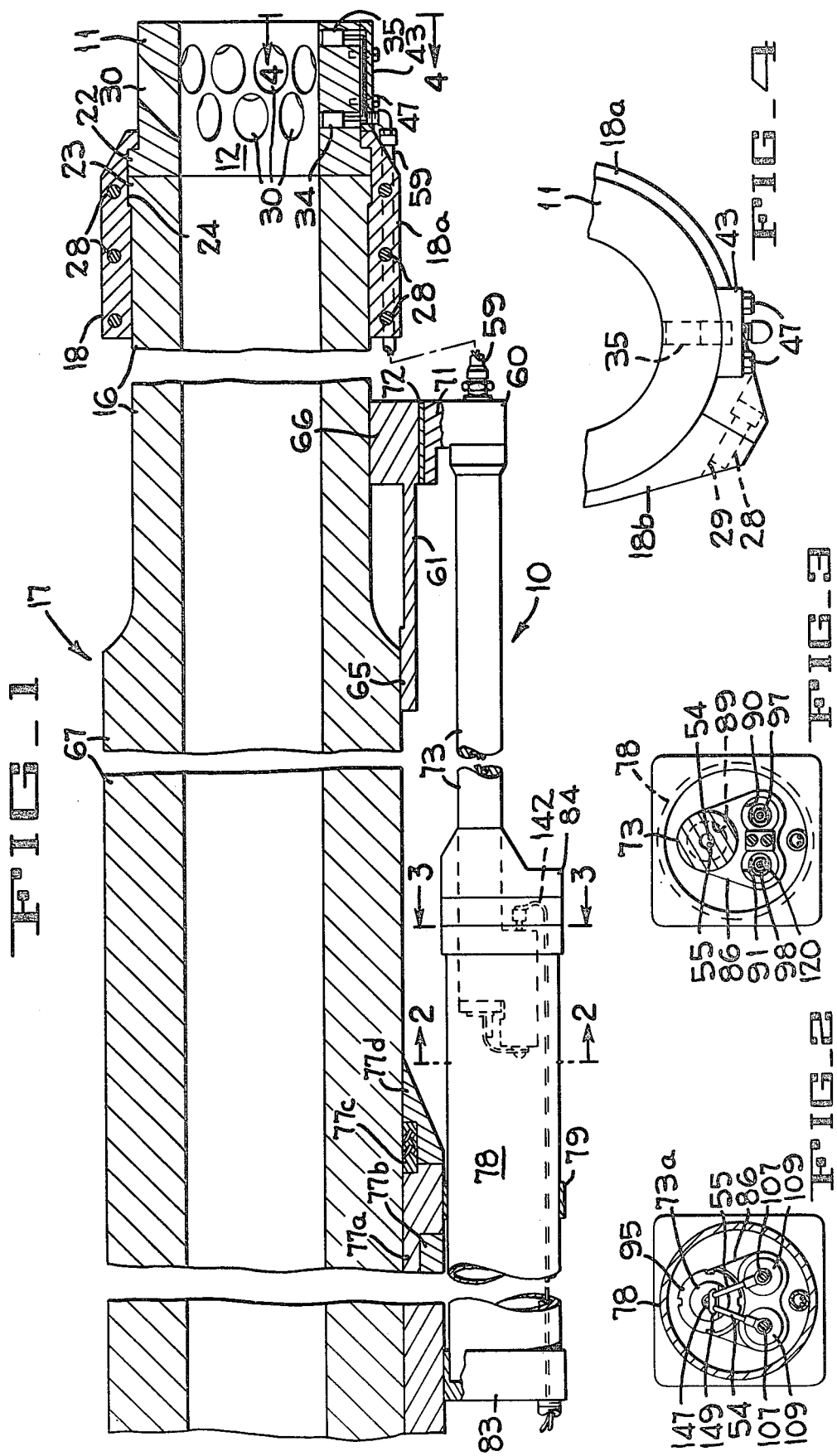

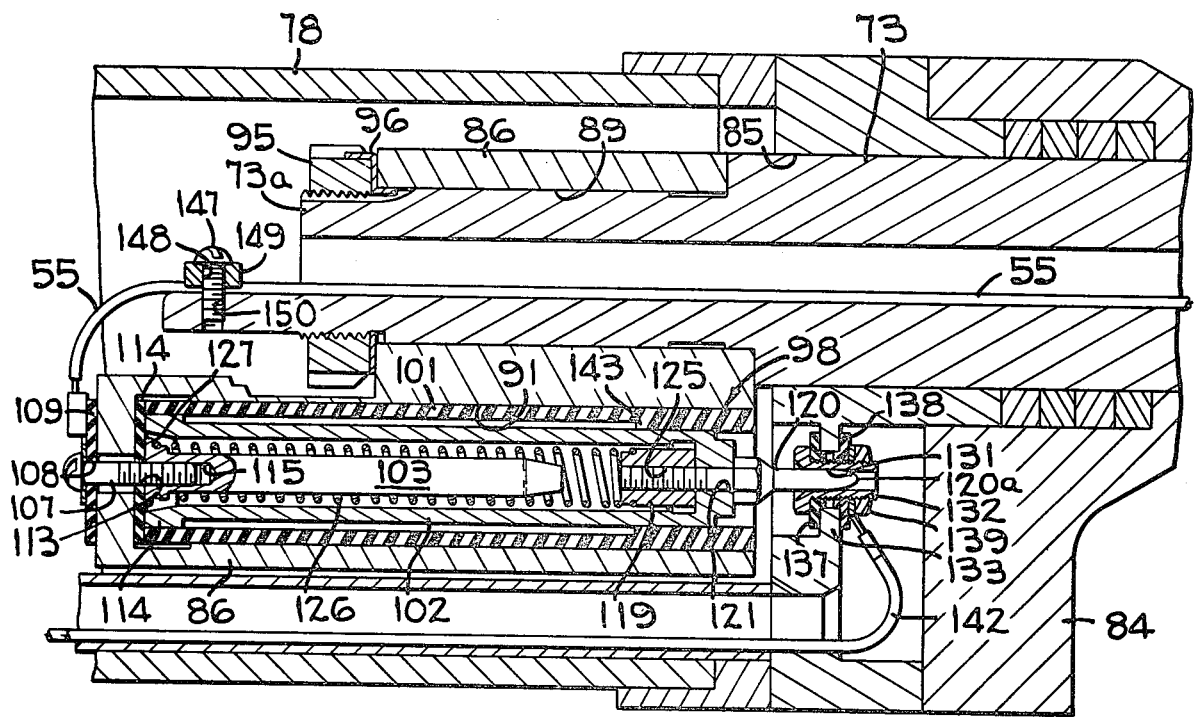
FIG_5
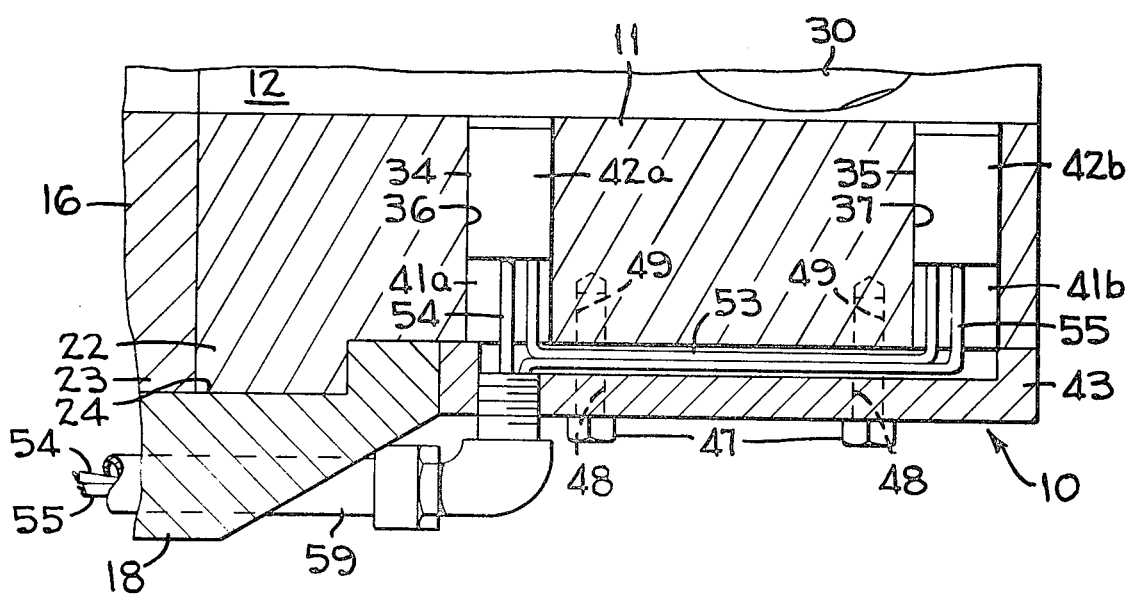
FIG_6

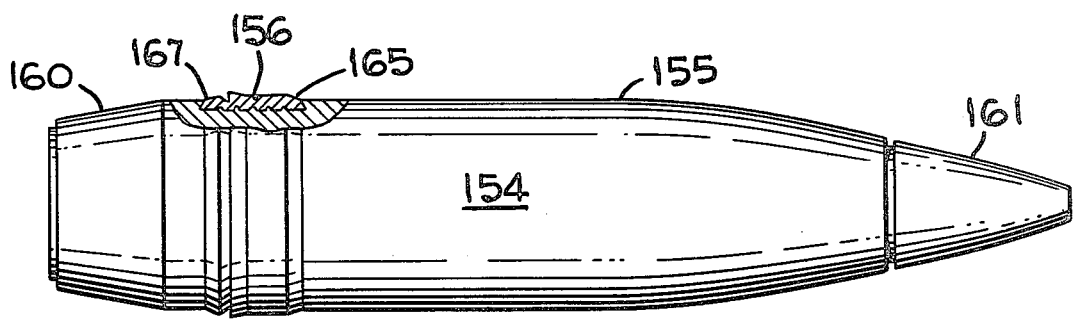
FIG_7
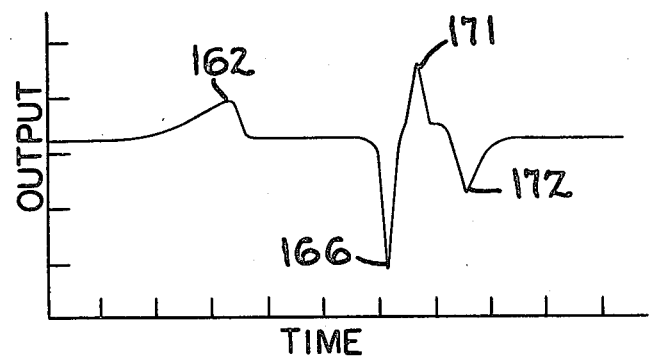
FIG_8
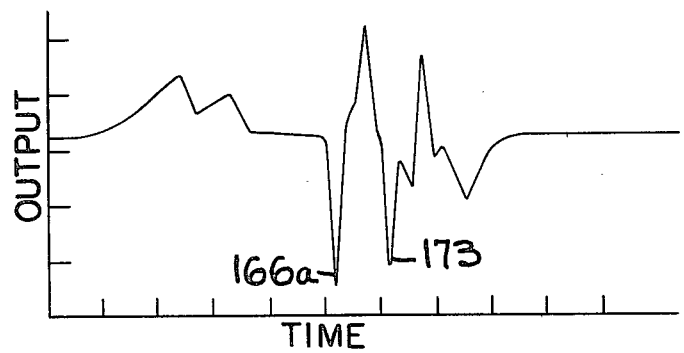
FIG_9

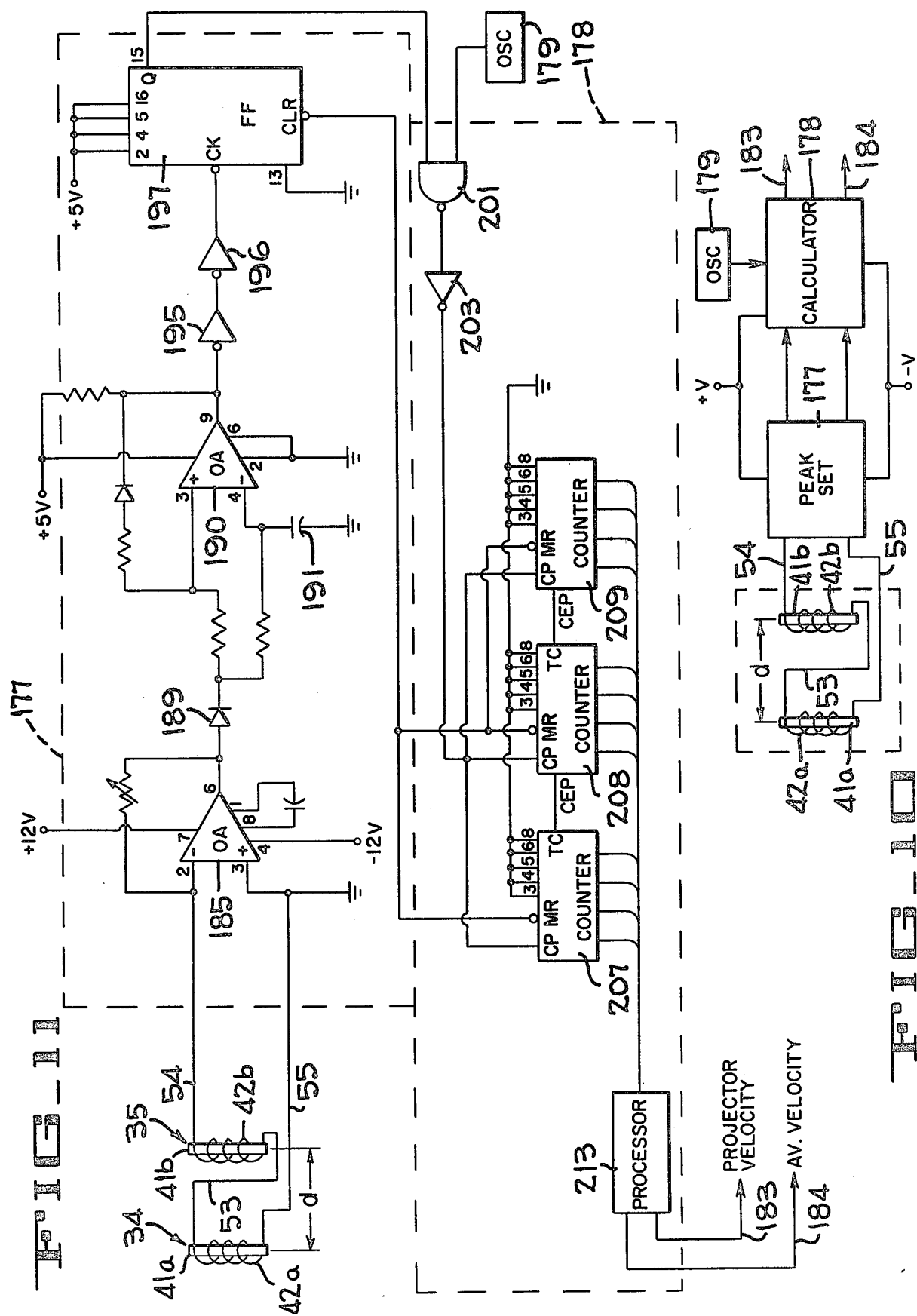

MUZZLE VELOCIMETER

BACKGROUND OF THE INVENTION

1. Field of the Invention

The present invention pertains to apparatus for measuring the velocity of a projectile, and more particularly, to apparatus for measuring the muzzle velocity of a projectile fired from a gun.

2. Description of the Prior Art

Muzzle velocity is an important parameter in fire control systems wherein a field gun is aimed at a distant target. Typically, in a fire control system, muzzle velocity is assumed to be a constant parameter, and the more apparent variable parameters, such as wind data and target range, are entered into the fire control system and to compute gun-laying orders. However, muzzle velocity is not constant because the variations in powder charge and variations in projectile weight may cause considerable variations in the muzzle velocity for a given type of weapon. Also, barrel wear causes each individual gun to have different muzzle velocity characteristics over its useful life. Even over the short period of time, changes in the temperature of the barrel cause variations in the muzzle velocity.

To overcome the problem of a variation in muzzle velocity, it is desirable to measure muzzle velocity directly and enter the measured data into the fire control system to increase accuracy. Three types of velocity measurement systems are known: optical, radar, and strain gauge.

The optical-electronic type of muzzle velocimeter uses a pair of light beams perpendicularly to the path of the projectile so the projectile intercepts the beams. The time interval between interruptions of the beams, as sensed by a pair of photo-detectors, is used to compute velocity. However, optical sensing systems are subject to interference from powder blasts and are generally not rugged enough for field use.

Conventional radar apparatus can be used to measure muzzle velocity by aiming the radar at the projectile after it is fired and determining projectile velocity from analysis of signals reflected from the projectile. Radar systems are expensive and always expose the installation to some risk that the radar emission may reveal the gun location.

Another technique to measure muzzle velocity is the strain-gauge measurement of hoop stress. This unique approach is based on the observation that a projectile, when fired, causes a slight deformation in the barrel as the projectile travels therethrough and this deformation causes hoop stress. Two strain gauges spaced a distance apart on the gun barrel sense the hoop stress caused by a passing projectile. Muzzle velocity is then determined by dividing the distance between strain gauges by the time required for the projectile to pass between the strain gauges.

SUMMARY OF THE INVENTION

The present invention provides a simple, accurate and rugged measurement means to determine the velocity of a projectile. The invention comprises apparatus for establishing a magnetic field in the path of the projectile and a magnetic sensor for sensing a change in the magnetic field when a projectile passes the sensor.

Projectiles used with the present invention contain magnetic materials which cause disturbances in the magnetic field when one of the projectiles is fired through the magnetic field. One embodiment of the present invention includes a single magnetic sensor which is disposed adjacent to the path of the projectile. The sensor detects one disturbance when the projectile enters the magnetic field, and detects another disturbance when the projectile exits from the magnetic field. Muzzle velocity is determined by measuring the time interval between magnetic sensor outputs corresponding to the leading edge and trailing edge of a projectile and by using the known geometry of the projectile. The muzzle velocity is computed by dividing the effective length of the projectile by the measured time interval.

Another embodiment of the present invention provides apparatus for measuring the velocity of a projectile wherein the measurement is independent of the geometry of the projectile. This embodiment comprises a pair of magnetic field sources and a pair of sensors. A first electromagnet or other means is used for establishing a first magnetic field in the path of the projectile and a second electromagnet or other means is used for establishing a second magnetic field in the path of the projectile with the second magnetic field spaced a predetermined distance from the first magnetic field along the path of the projectile. A first magnetic sensor senses changes in the first magnetic field as a projectile passes the first sensor and a second magnetic sensor changes in the second magnetic field as the projectile passes the second sensor. Muzzle velocity is determined by measuring the time interval between sensor outputs and dividing this time into the distance between sensors.

BRIEF DESCRIPTION OF THE DRAWINGS

FIG. 1 is a longitudinal section of a muzzle velocimeter of the present invention showing the velocimeter attached to the outer end of the muzzle of a gun.

FIG. 2 is an enlarged view of a portion of the present invention taken along the line 2—2 of FIG. 1.

FIG. 3 is an enlarged view of a portion of the present invention taken along line 3—3 of FIG. 1.

FIG. 4 is an enlarged view of a portion of the velocimeter taken along the line 4—4 of FIG. 1.

FIG. 5 is an enlarged cross-sectional view of a mechanism for connecting the electromagnetic sensors to an output circuit with the connecting mechanism shown in an engaged position.

FIG. 6 is an enlarged sectional view of a portion of the muzzle velocimeter of FIG. 1.

FIG. 7 shows details of a projectile of the type which can be fired by the gun shown in FIG. 1.

FIG. 8 is a voltage waveform of the output of one of the velocity sensors of FIG. 1 developed when a projectile of the type shown in FIG. 7 moves past the sensor.

FIG. 9 is the voltage waveform from the velocity sensors developed when a projectile moves past a pair of sensors connected in series.

FIG. 10 is a block diagram of the muzzle velocimeter and its associated electronic circuitry.

FIG. 11 is a schematic diagram of the circuit portion of the electronic circuitry used with the muzzle velocimeter.

DESCRIPTION OF THE PREFERRED EMBODIMENT

Figure 12:
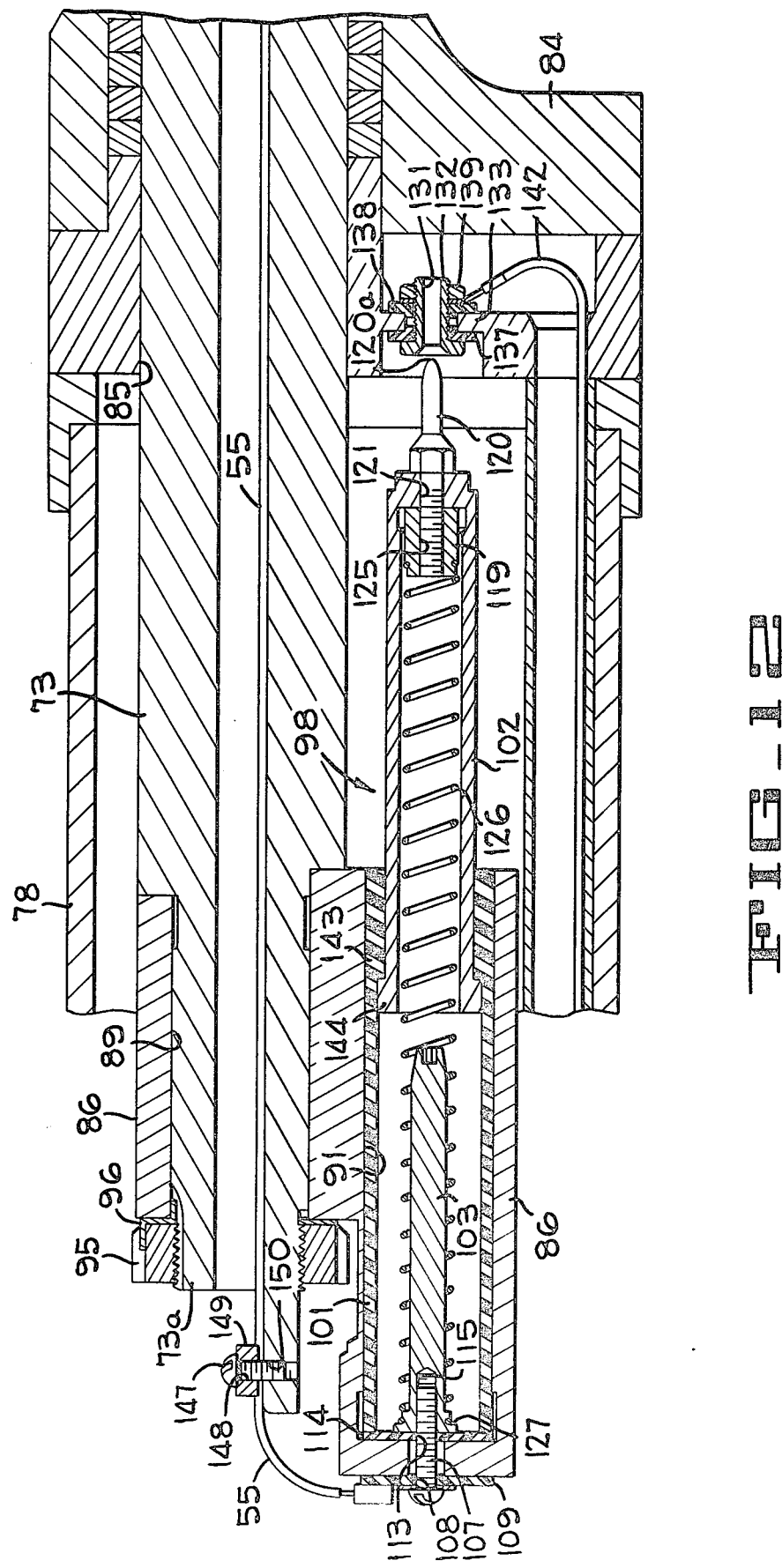
FIG. 12 is an enlarged cross-sectional view of the connecting mechanism of FIG. 5, but with the mechanism in a disengaged position.

A muzzle velocimeter 10 of the present invention shown in FIG. 1 includes an annular housing 11 formed from a non-magnetic material such as stainless steel, with the housing having an axially extending passage 12 through which projectiles pass. The velocimeter 10 is secured to the muzzle 16 of a gun 17 by an annular sleeve 18. A radial flange 22 on the left end of the housing 11 and a radial flange 23 on the right end of the muzzle 16 are mounted in an annular groove 24 of the sleeve 18 to secure the velocimeter housing 11 to the end of the gun 17. The sleeve 18 is formed of two semi-cylindrical portions 18a, 18b (FIG. 4) connected together by a plurality of capscrews 28 (FIGS. 1, 4) each mounted in a threaded bore 29.

The velocimeter housing 11 includes a plurality of exhaust ports 30 for venting gasses when a projectile is fired from the gun 17. A pair of sensors 34, 35 (FIGS. 1, 4, 6) are mounted in a pair of radial bores 36, 37 (FIG. 6) in the housing 11 of the velocimeter 10. Each of the sensors 34, 35 includes a permanent magnet 41a, 41b, having a coil of wire 42a, 42b mounted thereon. The sensors 34, 35 are secured in the bores 36, 37 by a plate 43 (FIGS. 1, 4, 6) which is connected to the housing 11 by a plurality of capscrews 47 each projecting through a hole 48 in the plate 43 into a threaded bore 49 in the housing 11. The coils 42a, 42b are connected in series by an interconnecting wire 53 and a pair of output leads 54, 55. The output leads 54, 55 extend from the velocimeter 11 through a conduit 59 to a bracket 60 which is connected to the underside of the gun 17. The bracket 60 (FIG. 1) includes a collar 61 having a pair of radially inward flanges(not shown) to the collar 61 so the bracket 60 and an elongated tube 73 connected thereto are fixed to the gun barrel 67. The gun barrel 67 is slidably mounted on a plurality of interconnected supports 77a–77d. An elongated tube 78 is welded or otherwise connected to a shim 79 which, in turn, is welded or otherwise connected to the support 77a. The left end of the tube 78 (FIG. 1) is also connected to the support 77a by an annular cap 83. An annular cap 84 connected to the right end (FIGS. 1, 5, 12) of the tube 78 includes a bore 85 to slidably receive the tube 73. The left end (FIGS. 5, 12) of the tube 73 extends through a bore 89 in a generally triangular shaped housing 86 (FIGS. 2, 3, 5, 12) having a trio of longitudinal bores 89–91. A nut 95 and a lock washer 96 mounted on a threaded end portion 73a secure the housing 86 to the tube 73. A pair of signal wires connect devices 97, 98 mounted in the bores 90, 91 respectively. Only the connecting device 98 will be described and it should be understood that the device 97 operates in a like manner.

The connecting device 98 includes an outer cylinder 101 (FIGS. 5, 12) slidably mounted in the bore 91 and a piston 102 slidably mounted in the cylinder 101. The outer cylinder 101 is made from an insulating material and is glued or otherwise secured in position inside the bore 91. A cylindrical guide pin 103 is mounted inside the cylinder 101 by a screw 107 which extends through a bore 108 in a first insulating washer 109 and through a hole 113 in a second insulating washer 114 into a threaded bore 115 in the guide pin. A cylinder 119 (FIGS. 5, 12) is mounted at the right end of the piston 102 by a cylindrical plug 120 extending through a hole 121 in the end of the piston into a threaded bore 125 in the cylinder 119. A spring 126 connected between the cylinder 119 and a shoulder 127 on the guide pin 103 biases the piston 102 and the plug 120 away from the washer 114 in the bore 91 to move the tip 120a of the plug into a bore 131 in a housing 132 when the gun is in the "rest" position shown in FIG. 5. The housing 132 (FIG. 5) is secured in position about a radial flange 133 by a pair of L-shaped insulating washers 137, 138 and by a nut 139 threaded on the right end of the housing. One end of an output lead 142 is clamped between the nut 139 and the washer 138 to provide an electrical connection to the housing 132. The output lead 55 is clamped between the screw 107 and the washer 109 to provide an electrical connection to the guide pin 103, and the spring 126 provides an electrical connection between the guide pin 103 and the cylinder 119.

When the gun is fired the gun barrel 67 (FIG. 1) recoils toward the left causing the velocimeter 10, the tube 73, and the housing 86 to move toward the left with the housing 86 moving inside the bore 85 from the position shown in FIG. 5 to the position shown in FIG. 12. As the tube 73 and the housing 86 move to the left, the right end 120a of the plug 120 remains in the receptacle 132 and the piston 102 remains in the position shown in FIG. 5, but the outer cylinder 101 continues to slide toward the left until a radially inward flange 143 on the cylinder 101 contacts a radially outward flange 144 on the piston 102. Further movement of the cylinder 101 pulls the piston 102 and the plug 120 to the left so the end 120a of the plug is pulled out of the receptacle 132 (FIG. 12) thereby breaking the electrical contact between the plug 120 and the receptacle 132. A screw 147 extending through a hole 148 and a clip 149 into a threaded bore 150 in the tube 73 retains the output leads 54, 55 (FIGS. 2, 5, 12) in position during the recoil movement of the gun.

A projectile 154 (FIG. 7) for use with the gun 17 includes an elongated body portion 155 containing magnetic material and having an annular band 156 mounted near the trailing edge 160 of the projectile. The band 156 may be made of brass or other nonmagnetic material. When a leading portion 161 of the projectile (FIG. 7) passes the coil 34 (FIGS. 1, 6) a positive pulse 162 (FIG. 8) of voltage develops in the coil 42a due to a disturbance in the magnetic field about the permanent magnet 41a. When a leading edge 165 of the band 156 of the projectile passes the coil 42a a negative pulse 166 (FIG. 8) develops due to an increase in the magnetic field about the magnet 41a; and when a trailing edge 167 of the band 156 passes the coil 42a, a positive pulse 171 is developed by the coil 41a. The trailing edge 160 of the projectile causes the coil 41a to produce a negative pulse 172. The velocity of the projectile can be calculated by using the time duration between pulses 162, 172 and the length of the projectile 154, or the velocity can be calculated by using the time duration between pulses 166, 171 and the distance between the leading edge 165 (FIG. 7) and the trailing edge 167 of the band 156.

When the coils 42a, 42b are connected in series (FIG. 6) a negative pulse 166a (FIG. 9) is developed between the output leads 54, 55 when the leading edge 165 (FIG. 7) of the band 156 passes the coil 42a (FIG. 6) and another negative pulse 173 is developed in leads 54, 55 when the leading edge 165 passes the coil 42b. The velocity of the projectile can be calculated by using the time duration between pulses 166a, 173 and the distance between coils 42a, 42b.

Electronic circuitry which can be used to calculate the projectile velocity from the voltage waveforms of FIG. 9 is disclosed in the block diagram of FIG. 10 and in the detailed circuit diagram of FIG. 11. The coils 42a, 42b are connected to a peak detector 177 (FIGS. 10, 11) which sends a start pulse to a calculator 178 in response to a first negative input pulse 166a (FIG. 9) and sends a stop pulse to the calculator 178 in response to a second negative input pulse 173. During the time interval between receiving the start pulse and receiving the stop pulse, the calculator 178 counts the number of cycles developed by an oscillator 179. The number of cycles counted by the calculator 178 and the distance "d" between coils 42a, 42b is used by the calculator to determine the velocity of the projectile which produced the negative pulses 166a, 173. The velocity of the individual projectile is provided to an output lead 183 by the calculator 178. The calculator stores the velocity of the last individual projectile, uses the velocity of the last "n" number of projectiles to calculate an average velocity and provides this average velocity to another output lead 184 of the calculator. The number of projectiles n used to calculate the average velocity can be selected by a program which is stored in the calculator and this number can be changed as desired.

The peak detector 177 (FIG. 11) includes an operational amplifier 185 which amplifies and inverts the polarity of the pulses (FIG. 9) viewed from the coils 42a, 42b. The amplified signal is rectified by a diode 189 so that only positive pulses resulting from the negative peaks 166a, 173 (FIG. 9) are coupled to both inputs of a comparator 190. A capacitor 191 causes the signal at the inverting input 4 to lag the signal at the non-inverting input 3 of the comparator 190. When the positive pulse at the input 3 of the comparator 190 reaches a peak value and starts to decrease the rising pulse (delayed pulse) at the input 4 causes the voltage at an output 9 to drop from a high value to a low value. The dropping voltage is coupled through a pair of inverters 195, 196 to a flip-flop 197 causing the flip-flop to toggle, or change states. The first dropping voltage (caused by negative peak 166a, FIG. 9) causes the voltage on the Q output of the flip-flop 197 to toggle from low to high thereby enabling a NAND-gate 201 so pulses from the oscillator 179 are coupled through the gate 201 and through an inverter 203 to the CP inputs of a plurality of counters 207–209. The oscillator pulses are counted by the counters 207–209 until the next negative pulse 173 (FIG. 9) from the coils 42a, 42b causes the flip-flop 197 to toggle and produce a low value of voltage on the Q output, thereby disabling the NAND-gate 201 and interrupting the counting by the counters 207–209. The final count from the counters 207–209 is supplied to a microprocessor 213 which uses the final count to calculate the velocity of the projectile and provide the velocity information to the output lead 183. The microprocessor 213 also provides an average velocity of a predetermined number of previously fired projectiles to the output lead 184. A flip-flop 197 which can be used in the present invention is the model 5474 built by several manufacturers. Each of the counters 207–209 can be the model 9316 made by several manufacturers. A microprocessor 213 which can be used with the present invention is the model 8085 built by Intel Corporation of Santa Clara, California.

The present invention discloses apparatus for accurately measuring the velocity of projectiles fired from guns under rugged field conditions using a magnet to provide a magnetic field in the path of the projectile. A coil adjacent the magnet developes electrical signals caused by distortion of the magnetic field as the projectile moves through the field. These signals and the length of the projectile are used by a computer to accurately calculate projectile velocity.

Although the best mode contemplated for carrying out the present invention has been herein shown and described, it will be apparent that modification and variation may be made without departing from what is regarded to be the subject matter of the invention.

What is claimed is:

1. A muzzle velocimeter mounted for use with a portion of a projectile containing magnetic materials and with a gun barrel having a longitudinal bore for the passage of said projectile, said projectile having a nonmagnetic band mounted about at least a portion of said projectile, said velocimeter comprising:

a first and second sensor, each sensor including a magnetic core having a first and a second magnetic pole and with a coil of wire wound about said core;

means for mounting said magnetic core and sensor in a separate spaced recessed portion of said velocimeter adjacent the muzzle of said gun with one of said magnetic poles adjacent a path taken by said projectile to establish a magnetic field adjacent said bore of said barrel where a movement of said projectile through said magnetic field generates a first electrical signal in said coil as a front portion of said nonmagnetic band passes through said magnetic field and said magnetic field generates a second electrical signal in said coil as a rear portion of said nonmagnetic band passes through said magnetic field; and calculator means for using said first and said second electrical signals to determine the velocity of said projectile as it moves through said magnetic field.

2. A velocimeter as defined in claim 1 wherein the length of said nonmagnetic band and the timing of said first and said second signals are used to calculate velocity of said projectile.

3. A muzzle velocimeter mounted for use with a portion of a projectile containing magnetic materials and with a gun barrel having a longitudinal bore for the passage of said projectile, said projectile having a nonmagnetic band mounted about at least a portion of said projectile, said velocimeter comprising:

a first and second sensor each sensor including a pair of magnets each having a pair of magnetic poles and a coil of wire mounted thereon;

means for mounting said magnets and sensor in a separate spaced recessed portion of said velocimeter in spaced relationship adjacent said gun barrel, with a first magnet immediately adjacent said bore of said gun and a second magnet a distance from said bore with one of said magnetic poles of each magnet adjacent a path taken by said projectile to provide a pair of magnetic fields through which said projectile successively moves; and calculator means connected to said coils for determining the velocity of said projectile by using electrical signals developed by said coils as said nonmagnetic band of said projectile moves through said magnetic fields.

4. A velocimeter as defined in claim 3 wherein the distance between said coils and the timing of said electrical signals in said coils are used to calculate the velocity of said projectile.

5. A velocimeter as defined in claim 3 including an annular housing having an axially extending passage, means for mounting said annular housing on said gun barrel with said axial passage aligned for the passage of said projectile, and means for mounting said first and said second magnets in said housing with one of said poles of each magnet adjacent said axial passage.

* * * * *